United States Patent [19]

Stephenson, III et al.

[11] Patent Number: 5,666,575
[45] Date of Patent: Sep. 9, 1997

[54] CARTRIDGE STATUS INDICATOR

[75] Inventors: Stanley Ward Stephenson, III, Spencerport; Tom Michael Seamans, Corfu, both of N.Y.

[73] Assignee: Eastman Kodak Company, Rochester, N.Y.

[21] Appl. No.: 608,426

[22] Filed: Feb. 28, 1996

[51] Int. Cl.[6] .............................. G03B 17/36; G03B 17/26
[52] U.S. Cl. .......................... 396/284; 396/515; 396/538
[58] Field of Search .................................... 354/275, 288, 354/212, 215, 217, 218, 21; 396/207, 284, 512, 515; 242/357; 352/172

[56] References Cited

U.S. PATENT DOCUMENTS

| | | | |
|---|---|---|---|
| 3,590,711 | 7/1971 | Milanese et al. | 396/284 |
| 5,023,642 | 6/1991 | Pagano | 354/275 |
| 5,105,211 | 4/1992 | Kameyama | 354/173.1 |
| 5,248,108 | 9/1993 | Zander | 242/71.1 |
| 5,255,034 | 10/1993 | Shimada et al. | 354/173.1 |
| 5,296,887 | 3/1994 | Zander | 354/275 |
| 5,351,102 | 9/1994 | Tsuji et al. | 354/106 |
| 5,357,302 | 10/1994 | Kawamura et al. | 354/213 |
| 5,463,435 | 10/1995 | Ezawa | 354/21 |
| 5,497,213 | 3/1996 | Yoshida et al. | 354/21 |

*Primary Examiner*—Alan A. Mathews
*Attorney, Agent, or Firm*—Peter J. Bilinski; Robert Luke Walker

[57] ABSTRACT

A camera includes a chamber for containing a film cartridge having a rotatable film spool with external engagement access to allow rotation of the spool. The chamber is closed by a lighttight door having a cavity including a status indicator member for determining the status of a contained film cartridge. The status indicator member is attached a cartridge engagement member which is rotatable with the cartridge film spool. The status indicator member includes a display disk for indicating the status of said cartridge based on the rotational position of said spool which is visible through an opening in the chamber door.

22 Claims, 5 Drawing Sheets

CARTRIDGE STATUS INDICATOR

CROSS-REFERENCE TO RELATED APPLICATION(S)

Reference is made to commonly assigned application Ser. No. 08/388,785, now U.S. Pat. No. 5,587,757, entitled: CAMERA ACCESS DOOR INTERLOCK MECHANISM, and filed in the names of Tom Seamans and Stanley W. Stephenson, III.

FIELD OF THE INVENTION

The invention relates generally to the field of photography, and in particular to still photographic cameras. More specifically, the invention relates a status indicator for a contained film cartridge of a camera.

BACKGROUND OF THE INVENTION

In conventional manual wind cameras, the exposed filmstrip is rewound into the confines of a lighttight film cartridge before a cartridge chamber door is opened to release the cartridge for processing.

With the advent of the so-called Advanced Photographic System (APS), a portion of an exposed filmstrip can be rewound back into the confines of the film cartridge and the filmstrip can be subsequently readvanced to the next unexposed portion of the filmstrip to continue exposure at a later time.

In any event, the filmstrip must be rewound before the cartridge chamber door is opened. The thrusting cartridge has a status indicator on the cartridge which describes the current state of the film cartridge, either exposed, partially exposed, or not exposed, which is plainly visible to the user.

In order for the cartridge chamber door to be opened, the rotatable film spool of the film cartridge must be in a specific rotational alignment, hereinafter referred to as the parked position. If the spool is not in the parked position, the cartridge chamber door cannot be opened which may be an annoyance to a user of the camera, who may not fully understand the reasons why the cartridge chamber door fails to open. Though the status indicator of the film cartridge correctly relates this information, there is no effective way to relay the status information to the user.

One possible means of providing the information might be to make the door partially transparent to visually scan the state of the cartridge. Though this technique may be suitable for conventional 35 mm film cartridges, it is not suitable for thrusting type film cartridges, such as those described in U.S. Pat. No. 5,248,108, among others, which can only be made lighttight when the active light lock which is used to open and close the film door of the cartridge. If a transparent cover were used, ambient light would breach the lighttight integrity of the camera and prematurely fog the filmstrip.

Therefore, there is a need to provide a user with the film cartridge status to know when the film cartridge door of the camera can be opened, and why the door cannot be opened when the spool is not in the parked position.

SUMMARY OF THE INVENTION

The present invention is directed to overcoming one or more of the problems set forth above. Briefly summarized and according to one aspect of the present invention, there is provided a camera comprising:

a chamber for containing a film cartridge having an interior access sized for receiving a film cartridge and a door for lighttightly sealing said chamber when said door is closed, and characterized by:

indicator means for determining the status of a film cartridge contained within said chamber when said door is closed.

According to another aspect of the present invention, there is provided a camera comprising:

a chamber having an interior recess for receiving a film cartridge and a door for lighttightly sealing said chamber, said cartridge having a rotatable film spool; and means for rotating said film spool to wind film into and out of a film cartridge loaded in said chamber, characterized by:

indicator means for indicating the rotational position of said film spool of a film cartridge loaded in said chamber when said door is closed.

According to yet another aspect of the present invention, there is provided a camera comprising:

a chamber having an interior recess for receiving a film cartridge, said film cartridge having a rotatable film spool;

a door for lighttightly sealing said chamber; and means for rotating said film spool to cause film to be wound into and out of said film cartridge, which is characterized by:

an indicator member for indicating the rotational position of said film spool, said indicator member having engagement means for engaging said film spool to cause said indicator member to rotate with said film spool, said film spool being rotatable to a specific rotational position which can be indicated by said indicator member when said door is closed.

An advantage of the present invention is that the user can be aware of the status of a film cartridge which has been loaded into the cartridge chamber of the camera in order to correctly ascertain when to open the chamber door of the camera when the spool has been rotated to the parked position, in the case of a thrusting-type film cartridge.

A further advantage of the present invention is that the user can also be made aware of why the chamber door will not open when the status indicator member indicates the film spool of the cartridge is not in a parked position.

A further advantage of the present invention is that a status indication can be provided without interfering with the lighttightness of the film cartridge or the camera.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

The invention is herein described according to a camera according to a preferred embodiment. The camera includes a number of photographic components, such as a taking lens, a viewfinder, a shutter mechanism, a film advancing system, etc, each of which are within the scope of ordinary knowledge in the field, and discussion of which is not needed as to the workings of the present invention, except where indicated.

Figure 1:
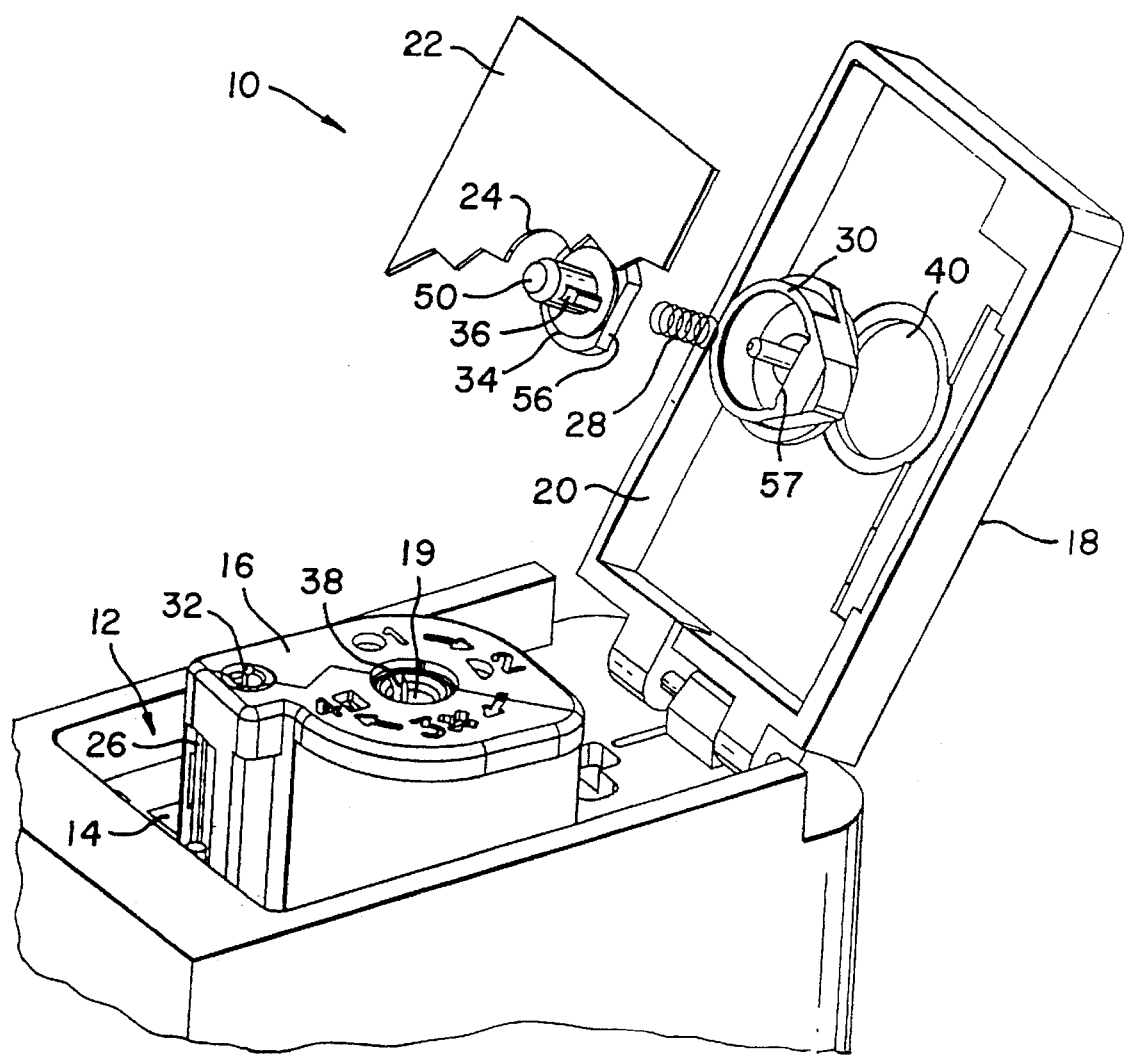
FIG. 1 is an exploded partial view of a camera, including the cartridge status indicator mechanism according to a preferred embodiment of the present invention.

Beginning with the exploded perspective view of FIG. 1, there is shown a camera 10 including a film cartridge chamber 12 having an interior recess 14 sized for receiving a film cartridge 16, shown partially in the FIG. A cartridge chamber door 18 is hingably opened to allow the film cartridge 16 to be loaded and unloaded from the interior recess 14 of the film cartridge chamber 12.

The film cartridge 16, according to this embodiment is of the thrusting-type, having a rotatable film spool 19 which when rotated in a film unwinding direction causes the leading end (not shown) of a contained filmstrip (not shown) to be advanced from the confines of the cartridge through a film door 26 which is opened by means of a light locking member 32. The light locking member 32 includes an exterior access which can be engaged for rotation to open and close the film door 26. Additional details relating to the thrusting-type cartridge are described in commonly assigned U.S. Pat. No. 5,248,108, which is hereby incorporated by reference.

Figure 2:
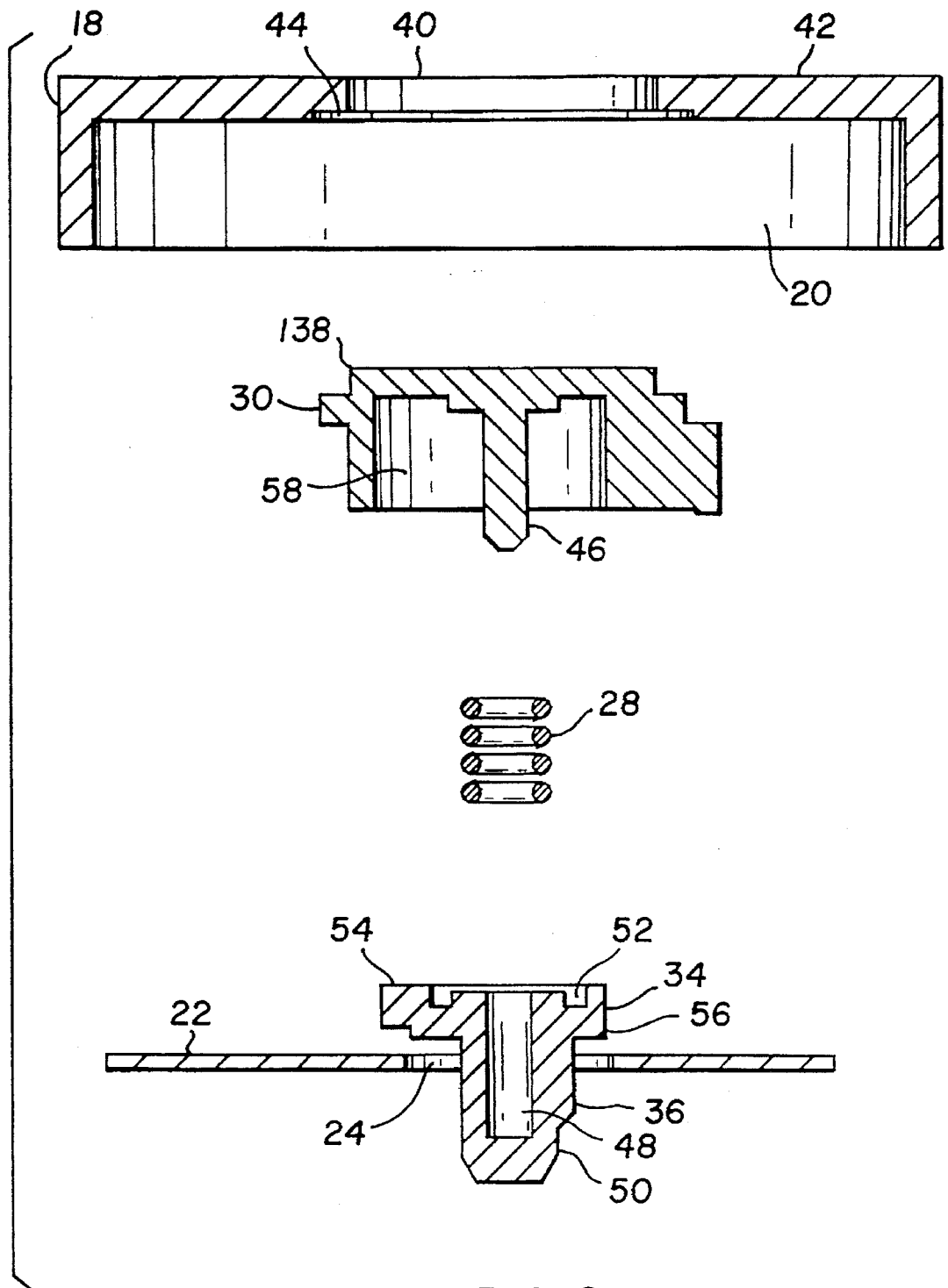
FIG. 2 is an exploded cross sectional view, partially shown, of the status indicator mechanism of FIG. 1.

Referring to FIGS. 1 and 2, the cartridge chamber door 18 is preferably made from an injection-molded plastic, having a defined cavity 20, which is covered by an inner or bottom plate 22 securely attached to the remainder of the chamber door by conventional means, such as screws or other fasteners.

The cartridge chamber door cavity 20 according to the preferred embodiment retains a status indicator member 30, a cartridge engagement member 34, and a biasing spring 28, each of which are sandwiched between the assembled bottom plate 22 and the interior of the chamber door 18.

Still referring to FIGS. 1 and 2, the status indicator member 30 includes an upper portion 138 which is fitted through an opening 40 in the top surface 42 of the chamber door 18. A recessed portion 44 on the door interior prevents the status indicator member 30 from extending through the opening 40 beyond the upper portion 138, the member having a height dimension which is slightly greater than the height dimension of the cavity 20.

The status indicator member 30 also includes a hollowed portion 58 sized for engaging the cartridge engagement member 34 including a downwardly depending pin 46 for engaging a corresponding receiving hole 48. The spring 28 is attached over the downwardly depending pin 46 and biases an upper portion 54 of the cartridge engagement member 34 to seat against the bottom plate 22. A lower engaging portion 50 of the cartridge engagement member 34 extends through an opening 24 of the bottom plate 22 for engaging a film cartridge 16 which has been loaded into the chamber 12, specifically the film spool 19. The openings 24 and 40 in the bottom plate 22 and the cartridge chamber door 18 are coaxial.

The lower engaging portion 50 of the cartridge engagement member 34 includes an exterior key-shaped cartridge spool engaging member 36 configured to engage a keyway 38 of the film spool 19 of the film cartridge 16, as described in greater detail below.

Figure 3:
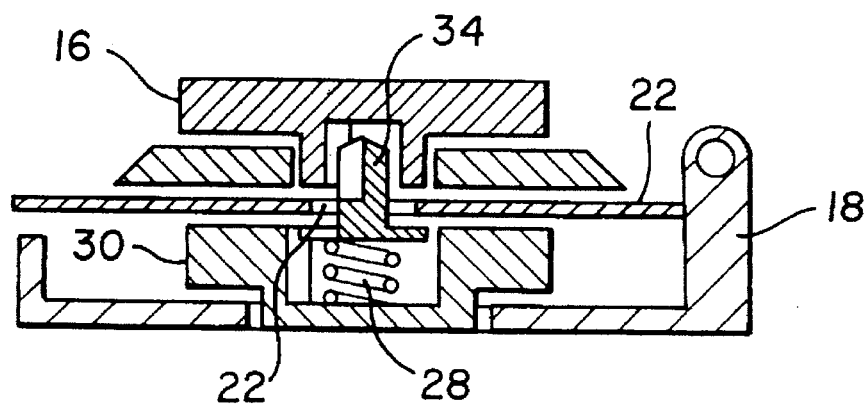
FIG. 3 is a sectional view of an assembled status indicator mechanism.

FIG. 3 provides a somewhat pictorial view of the status indicator mechanism as assembled within the cavity 20 of the chamber door 18, according to the present embodiment. Emphasized are the noted sandwiching of the status indicator member 30, the cartridge engagement member 34, and the biasing spring 28, as well as the respective seating of the status indicator member with the opening 40 of the cartridge chamber door 18 and the cartridge engagement member 34 with the opening 24 of the bottom plate 22.

Figure 5:
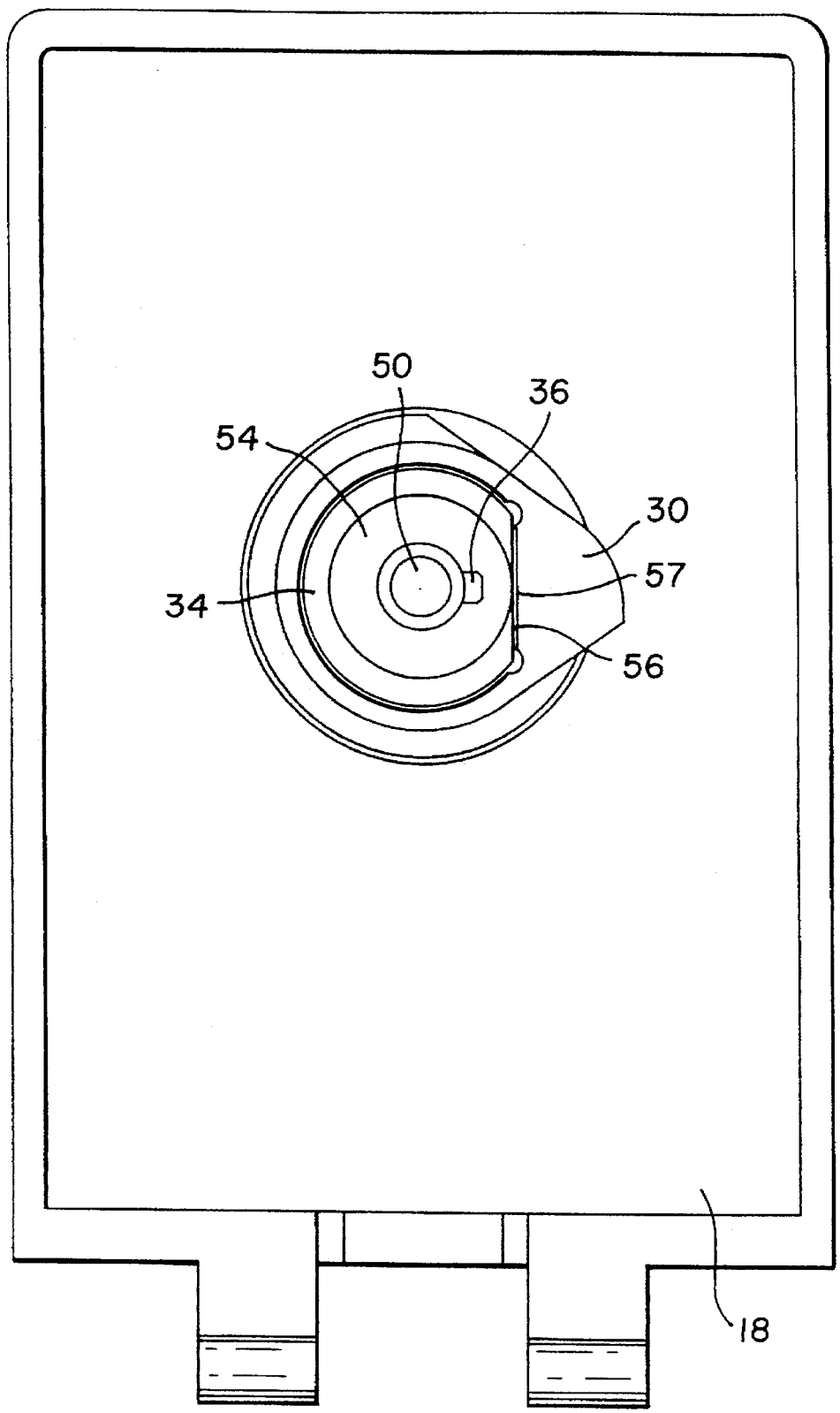
FIG. 5 is a bottom view of the chamber door of the camera with the bottom plate removed, showing the fit between the status indicator member with the cartridge engagement member of FIGS. 1–4.

FIG. 5 illustrates a bottom view of the cartridge chamber door 18 with the bottom plate 22 removed for clarity showing the fitting of the cartridge engagement member 34 within the hollowed portion 58, FIG. 1, of the status indicator member 30.

Referring briefly to FIGS. 1 and 5, the hollowed portion 58 includes a flat side surface 57 for engaging a corresponding flat side surface 56 of the fitted upper portion 54 of the cartridge engagement member 34 to provide positive engagement with the status indicator member 30.

Figure 4:
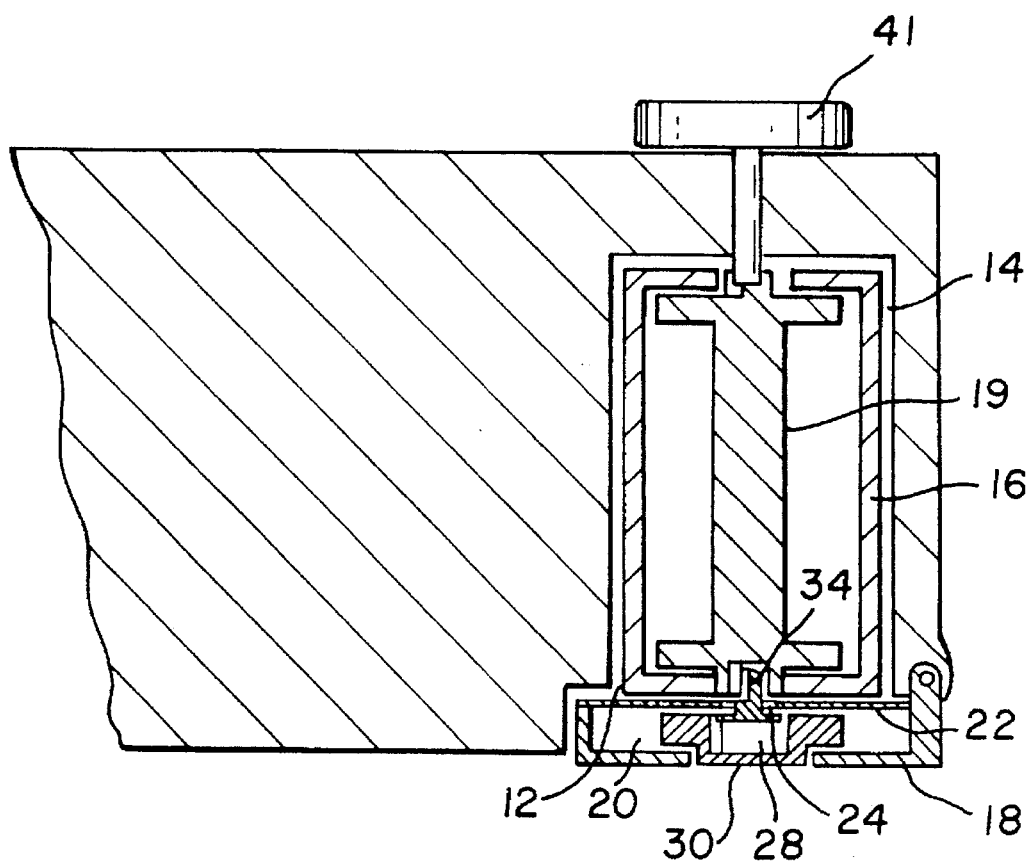
FIG. 4 is the sectional view of FIG. 3, showing the status indicator mechanism in perspective with the cartridge chamber of the camera.
Figure 6:
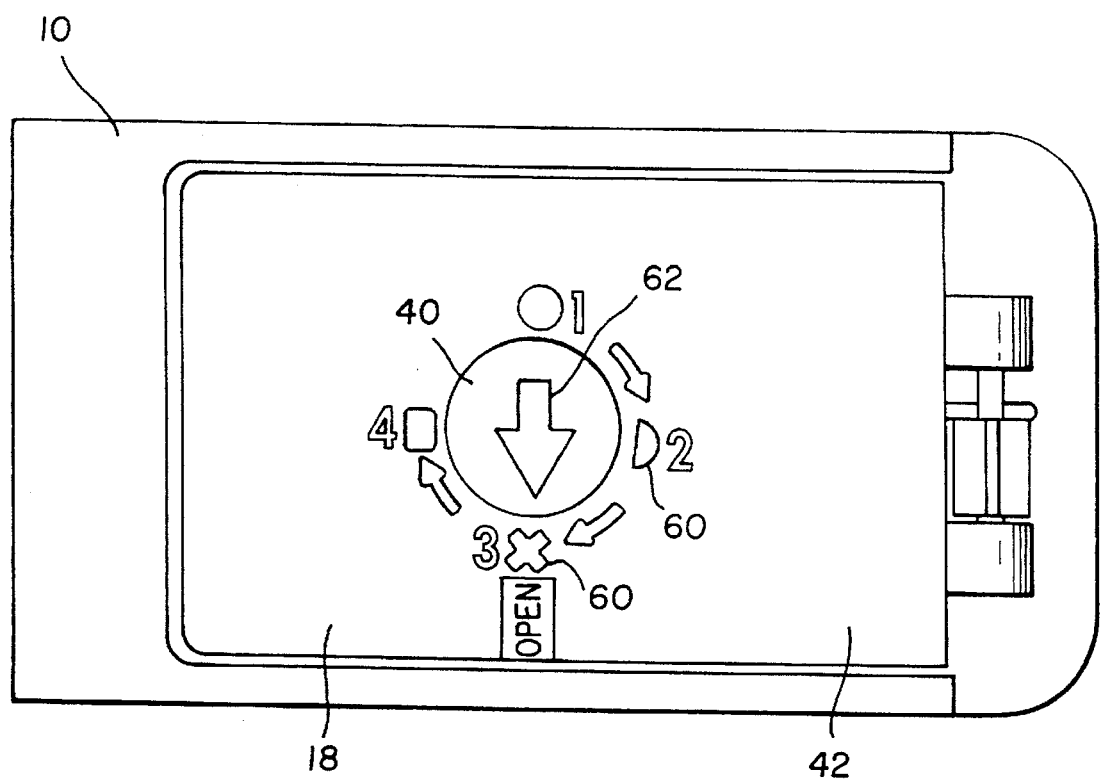
FIG. 6 is a partial top view of the status indicator mechanism with the cartridge chamber door closed.

FIG. 6 illustrates a partial top view of the camera 10 with the cartridge chamber door 18 closed. The top of the status indicator member 30 is visible through the opening 40, including a fiducial mark such as an arrow 62. Preferably, the arrow 62 is aligned with the cartridge spool engaging member 36 when the status indicating mechanism is assembled, as shown in FIG. 4. A set of other indicia 60 are circumferentially disposed about the opening 40 of the top surface 42 of the cartridge chamber door 18. This indicia 60 is similar to indicia found on the exterior of the film cartridge 16, FIG. 1.

In operation, and referring briefly to FIG. 4, the film cartridge 16 is inserted into the interior recess 14 of the cartridge chamber 12. The cartridge chamber door 18 can be then be closed and latched by a locking mechanism. This door mechanism (not shown) only permits the opening of the cartridge chamber 12 when the cartridge film spool 19 has been specifically oriented rotationally to a parked position. The opposite end of the cartridge chamber 12 includes a lighttight access to allow a rewind knob 41 of the camera 10 to engage the film spool 19 of the loaded film cartridge 16, as is conventionally known. Details pertaining to the door mechanism are found in commonly assigned and copending U.S. patent application Ser. No. 08/388,785, now U.S. Pat. No. 5,587,757, which is herein incorporated by reference.

Upon the closing of the cartridge chamber door 18, the exterior spool engaging member 36 and the keyway 38 of the cartridge film spool 19 may not immediately coincide. This nonalignmemt is handled by the fit of the cartridge engagement member 34 in the hollowed portion 58 and the biasing spring 28 until the spool engaging member 36 uniquely engages the keyway 38. At this point, the rotation of the film spool 19 of the film cartridge 16, the cartridge engagement member 34 and the status indicator member 30 are coincidental and coaxial.

After all or a portion of the filmstrip (not shown) has been exposed in the camera by known means, such as a film advancing mechanism (not shown), the rewind knob 41, FIG. 4, is used to return the filmstrip to the confines of the film cartridge 16 by engaging the film spool 19 and rotating the film spool in a film rewinding direction, as is commonly known.

As the exterior spool engaging member 36 of the cartridge engagement member 34 engages the keyway 38, the rotation of the cartridge film spool 19 causes a corresponding rotation of the engaged cartridge engagement member 34 and the status indicator member 30, visibly seen by the movement of the arrow 60, FIG. 6, in the opening of the top surface 42 of the chamber door 18.

The flat side surface 56 of the cartridge engagement member 34 provides positive engagement between the cartridge engagement member 34 and the status indicating member 30 with the side surface 57 of the hollowed portion 58, causing the status indicator member 30 and the cartridge engagement member 34 to coaxially rotate with the film spool 19.

After all of the filmstrip has been rewound by the rewind knob 41, and the film spool 19 has been oriented in the parked position, the door interlock mechanism (not shown) is disabled as described in the previously cross-referenced and copending U.S. patent application Ser. No. 08/388,785 now U.S. Pat. No. 5,587,757. The OPEN portion of the indicia 60 on the top surface 42 of the chamber door 18 aligns with the arrow 62 of the status indicator member 30 to provide input to the user that the cartridge door may be opened. If the arrow 62 is not aligned with the OPEN portion of the indicia 60, then the user is informed that the spool is not in the parked position, and the cartridge door will not be openable.

The invention has been described with reference to a preferred embodiment. However, it will be appreciated that variations and modifications can be effected by a person of ordinary skill in the art without departing from the scope of the invention.

PARTS LIST FOR FIGS. 1-6

10 camera
12 film cartridge chamber
14 interior recess
16 film cartridge
17 spool
18 cartridge chamber door
19 film spool
20 cavity
22 bottom plate
24 opening
26 film door
28 biasing spring
30 status indicator member
32 active light lock
34 cartridge engagement member
36 cartridge spool engaging member
38 keyway
40 opening
42 top surface
44 recess
46 depending pin
48 engaging hole
50 lower portion
52 cutout
54 upper portion
56 flat side surface
57 flat side surface
58 hollowed portion
60 indicia
62 arrow
138 upper portion

We claim:

1. A camera, for use with a photographic film cartridge, said camera comprising:
 a chamber for containing said film cartridge, said chamber having an interior recess sized for receiving said film cartridge;
 a door for lighttightly sealing said chamber when said door is closed;
 means for advancing and rewinding said photographic film; and
 a status indicator operatively connected to said film cartridge contained within said chamber, said status indicator being mounted for rotation relative to said door, said status indicator having a display portion visible when said door is closed.

2. A camera according to claim 1, wherein said film cartridge includes a rotatable film spool, and wherein said status indicator includes a spool engaging member disposed to engage and rotate with said film spool and said display portion indicates the status of the film cartridge based on the rotational position of said film spool.

3. A camera according to claim 1, wherein said status indicator is disposed at least partially within said door.

4. A camera according to claim 2, wherein said film spool has a keyway and wherein said spool engaging member includes a key-shaped exterior element engageable with said keyway of said film spool for uniquely engaging said film spool in a specific rotational position.

5. A camera according to claim 3, wherein said door includes an opening for said display portion.

6. The camera of claim 1 wherein said status indicator has an engagement portion extending into said recess for engagement of said film cartridge in a specific rotational position.

7. A camera, for use with a film cartridge having a rotatable film spool, said camera comprising:
 a chamber having an interior recess for receiving said film cartridge;
 a door for lighttightly sealing said chamber;
 means for rotating said film spool to wind film into and out of said film cartridge loaded in said recess; and
 a status indicator extending into said recess and being disposed for rotation by said film spool, said status indicator having a display portion visible when said door is closed, said display portion indicating the rotational position of said film spool of said film cartridge loaded in said chamber.

8. A camera according to claim 7, wherein said status indicator includes means for uniquely engaging said rotatable film spool in a specific rotational position and rotating with said film spool.

9. A camera according to claim 8, wherein said film spool has a keyway and wherein said means for uniquely engaging includes a key-shaped engaging element for engaging said keyway of said film spool.

10. A camera according to claim 7, wherein said door includes a cavity for receiving said status indicator, said door having an opening through which said display portion of said status indicator is visible when said door is closed.

11. The camera of claim 7 wherein said status indicator is disposed at least partially within said chamber door.

12. The camera of claim 9 wherein said key-shaped engaging element is spring biased toward said film spool.

13. A camera, for use with a film cartridge having a rotatable film spool, said camera comprising:
 a chamber having an interior recess for receiving said film cartridge;

indicator means including an engagement member for engaging said film spool to cause said indicator means to rotate with said film spool and a display member for indicating the status of said film cartridge based on the rotational position of said film spool; and a door for lighttightly sealing said chamber, said door including a cavity for receiving said indicator means, said door having an opening through which said display member is visible when said door is closed.

14. A camera according to claim 7, wherein said display means includes indicia indicating when said film spool is in a specific rotational position which allows said door of said chamber to be opened.

15. A camera according to claim 13, wherein said engagement member is spring biased to engage said rotatable film spool of said film cartridge loaded in said chamber.

16. The camera of claim 13 wherein said film spool has a keyway and said cartridge engagement member includes a key-shaped element engageable with said keyway of said film spool for uniquely engaging said film spool in a specific rotational position.

17. The camera of claim 13 further comprising means for rotating said film spool to wind film into and out of said film cartridge loaded in said recess.

18. A camera, for use with a thrusting film cartridge having a film spool rotatable into and out of a parked position, said camera comprising:

a chamber having a recess for receiving said film cartridge;

a door for lighttightly sealing said chamber when said door is closed;

means for rotating said film spool to wind film into and out of said film cartridge loaded in said recess; and a status indicator disposed for rotation by said film spool, said status indicator having a display portion visible when said door is closed, said display portion indicating whether said film spool is in said parked position.

19. The camera of claim 18 wherein said status indicator is disposed at least partially within said chamber door.

20. The camera of claim 18 wherein said status indicator has an engagement portion extending into said recess for engagement of said film spool in a specific rotational position.

21. The camera of claim 20 wherein said engagement portion is spring biased toward said film spool.

22. The camera of claim 21 wherein said status indicator is disposed at least partially within said chamber door.

* * * * *